US012646899B1

(12) United States Patent
Gomez et al.

(10) Patent No.: US 12,646,899 B1
(45) Date of Patent: Jun. 2, 2026

(54) ARMORED CABLE COIL TIE-IN DETECTOR

(71) Applicant: Encore Wire Corporation, McKinney, TX (US)

(72) Inventors: Casey A. Gomez, McKinney, TX (US); Jeremy T. Smith, The Colony, TX (US)

(73) Assignee: Encore Wire Corporation, McKinney, TX (US)

( * ) Notice: Subject to any disclaimer, the term of this patent is extended or adjusted under 35 U.S.C. 154(b) by 584 days.

(21) Appl. No.: 17/562,834

(22) Filed: Dec. 27, 2021

Related U.S. Application Data

(60) Provisional application No. 63/131,174, filed on Dec. 28, 2020.

(51) Int. Cl.
*H01R 43/28* (2006.01)
*B65H 61/00* (2006.01)

(52) U.S. Cl.
CPC ............ *H01R 43/28* (2013.01); *B65H 61/00* (2013.01); *B65H 2701/34* (2013.01)

(58) Field of Classification Search
CPC ..... H01R 43/28; B65H 2701/34; B65H 61/00
USPC .............................................................. 83/63
See application file for complete search history.

(56) References Cited

U.S. PATENT DOCUMENTS

| | | | | | |
|---|---|---|---|---|---|
| 3,269,248 | A * | 8/1966 | Nast | B23K 35/00 | 83/639.1 |
| 3,373,584 | A * | 3/1968 | Rundt | B21K 27/00 | 72/19.4 |
| 3,741,061 | A * | 6/1973 | Bevacqua | B23D 47/04 | 83/454 |
| 2015/0185269 | A1* | 7/2015 | Ngo | H02G 1/1256 | 324/543 |
| 2016/0285221 | A1* | 9/2016 | Pechter | H01R 43/20 | |
| 2021/0226399 | A1* | 7/2021 | Yang | H01R 43/055 | |

FOREIGN PATENT DOCUMENTS

| | | | | |
|---|---|---|---|---|
| CN | 202180256 | U | * | 4/2012 |
| DE | 3105845 | A1 | * | 9/1982 |
| JP | H11134952 | A | * | 5/1999 |

OTHER PUBLICATIONS

Translation, CN-202180256-U (Year: 2025).*

* cited by examiner

*Primary Examiner* — Nhat Chieu Q Do
(74) *Attorney, Agent, or Firm* — Warren Rhoades LLP

(57) ABSTRACT

A system and method of detecting a tie-in on a cable is disclosed. The method includes the steps of pulling a cable from a payoff reel; scanning the cable for a visual cue; detecting the visual cue; stopping the pull of the cable; cutting the cable; and discarding the cable portion with the visual cue.

11 Claims, 6 Drawing Sheets

ARMORED CABLE COIL TIE-IN DETECTOR

CROSS-REFERENCE TO RELATED APPLICATIONS

The subject application claims priority to and benefit of U.S. Provisional Application Ser. No. 63/131,174, filed on Dec. 28, 2020.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates in general to the coiling and packaging of electrical cables. More specifically, it relates to a system and method for automatically detecting tie-in sections of manufactured electrical cables to accurately and consistently discard coils or reels containing such sections during the coiling and packaging process.

2. Description of Related Art

Electrical cables are generally manufactured in great lengths during a continuous process. Because of current production techniques, it is common for a manufactured electrical cable to be first spooled onto a takeup reel by a spooling machine. This process is commonly referred to as the spooling process. It is common for an operator to spool multiple cables of varying length onto a single takeup reel during the spooling process. A wide variety of electrical cables are spooled with this process, including armored cables which includes metal-clad cables.

During the process of manufacturing armored cable, the insulated or bare conductors are helically wrapped with aluminum or steel strip resulting in an armored product. It is common that during the armoring process the aluminum or steel strip breaks or the supply of the strip is depleted. When this happens the operator cuts out the section of the armored cable that is without armor and the operator begins a new section of the armored cable on the takeup reel. A large takeup reel may contain 15,000-25,000 feet of armored cable with anywhere from 2-6 distinct sections of armored cable.

Manufacturers typically rewind the armored cable product after collection on the takeup reel on to a rewind takeup reel. During the armoring process, one direction of a convolution has a higher pitch angle than the other. End users typically prefer to pull the armored cable from a reel when the armored cable is oriented in a specific direction. This direction provides a smoother and easier way to pull the armored cable through studs and other construction material. To obtain the desired direction, the armored cable must be rewound. It is known in the industry that a takeup reel containing wire or cable in one process may be used as the payoff reel in a subsequent process. In the rewind process, the takeup reel from the spooling process functions as the payoff reel in the rewind process.

Operators, during the rewind process, note how many distinct sections and the footage for each distinct section as the armored cable is rewound. When one section is nearing its end, the operator stops the rewind process and physically ties the conductors from the end of that section with the beginning of the next section. This is known as a tie-in as the coupling is typically accomplished by the operator manually tying the two ends of the cables together. The rewinding process continues until another tie-in is needed or until the rewind takeup reel has been completed. Multiple smaller bundles of armored cables are created from the rewind takeup reel and distributed to a customer. The armored cable from the rewind takeup reel is cut down to final packaging footage and wound in coils or on reels.

It is common for one or more tie-ins to be inadvertently paid off into a coiling and/or packaging machine, unbeknownst to the operator, resulting in a packaged coil of cable that contains one or more tie-ins. For example, the cables are paid off from the single reel and into a coiling and/or packaging machine at extremely high speeds (e.g., 750 ft. per minute), making it difficult for the operator to visually locate and identify each tie-location for removal during the coiling and/or packaging process.

The traditional solution to this problem is the manual application of a colored label to the cable at each tie-in location during the rewinding process to identify each tice-section on the payoff reel. This application of a colored label further aids an operator's ability to visually locate each tie-in section during the coiling and/or packaging process. This system, however, relies on an operator to perform various manual operations during the coiling and/or packaging process. These manual operations are labor intensive and are generally prone to human error, thereby creating many issues and inefficiencies during the coiling and/or packaging process. For example, this system relies upon the operator to maintain a continual visual inspection for each colored tie-in label as the cables are paid off at high speeds from the payoff reel and into a coiling and/or packaging machine. This system fails when the operator does not keep track of the number of tie-ins on the payoff reel and, during normal operations, lose visual track of a tie-in label, resulting in a coil with a tie-in being packaged and shipped to customers.

Additionally, this system also relies on an operator to manually stop the entire coiling and/or packaging line altogether, if and when the operator visually locates a colored tie-in label, resulting in an increased likelihood of excess scrap if there is any delay by the operator to immediately stop the line once a colored tie-in label is located. This system further relies on the operator to cut and discard the resulting coiled cable once the line is manually stopped, resulting in delayed production to ensure the tie-in sections of cable were removed.

A need exists for a tie-in detector system and method that automatically detects tie-in sections of manufactured electrical cables, including armored cables, to accurately and consistently discard coils or reels containing such sections during the coiling and packaging process, without the disadvantages of the existing systems and methods. The importance of assuring all products that are delivered to customers meets every quality standard is one of the most important parts of any manufacturing process.

BRIEF SUMMARY OF THE INVENTION

The present disclosure is directed at an improved system and method for the coiling and packaging of manufactured electrical cables, including armored cables and metal-clad cables. An improved system and method for automatically detecting and discarding coils or reels containing the tie-in sections of manufactured electrical cables during the coiling and packaging process is disclosed.

The disclosed system and method eliminates many of the manual operations performed by an operator during the coiling and/or packaging process to overcome the above-mentioned shortcomings. More specifically, this system and method is independent of an operator's ability to maintain a continual visual inspection to locate each tie-in label as the cables are paid off at high speeds from the payoff reel into a coiling and/or packaging machine, as well as an operator's ability to manually stop the entire coiling and/or packaging line once a tie-in label has been identified. This system and method automatically detects and discards coils or reels containing any tie-ins sections of cables that are paid off from the payoff reel into a coiling and/or packaging machine, during the coiling and packaging process to minimize the likelihood of manufacturing a packaged coil of cable that contains one or more tie-ins. The system and method, according to one embodiment, utilizes a sensor system to detect each colored label near each tie-in location as the cable is paid off from the payoff reel into the coiling and/or packaging machine. In this system and method, according to one embodiment, the sensor system is programmed to allow each tie-in section of cable to be pulled through the coiling and/or packaging machine for a predetermined footage length or a predetermined length of time before the pulling of the cable is stopped once a tie-in is detected. The cable is then cut and the cable with the tie-in section is discarded outside of the normal product path.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings.

DETAILED DESCRIPTION OF THE INVENTION

Figure 1:
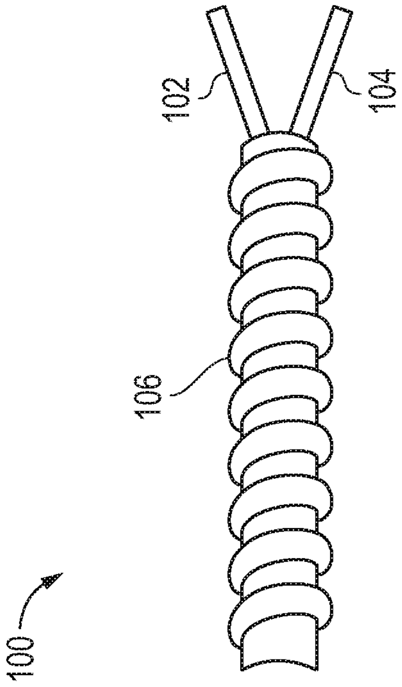
FIG. 1 is a diagram on an exemplary cable.
Figure 2:
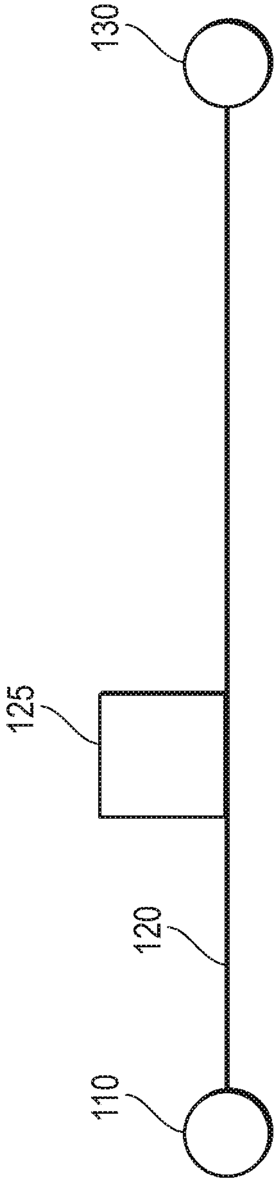
FIG. 2 depicts an overview of an armored cable rewinding system in accordance with one embodiment of the invention.
Figure 3:
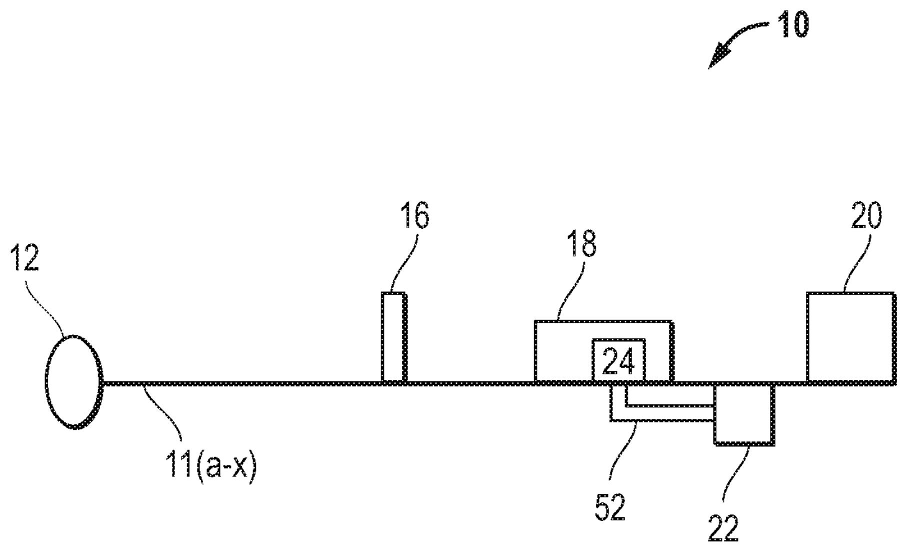
FIG. 3 depicts an overview of a wire or cable packaging system in accordance with one embodiment of the invention.

Before explaining at least one disclosed embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for purpose of description and should not be regarded as limiting.

It should be understood that any one of the features of the invention may be used separately or in combination with other features. Other systems, methods, features, and advantages of the present invention will be or become apparent to one with skill in the art upon examination of the drawings and the detailed description. It is intended that all such additional systems, methods, features, and advantages be included within this description, be within the scope of the present invention, and be protected by accompanying claims.

The present disclosure is described below with reference to the Figures in which various embodiments of the present invention are shown. The subject matter of the disclosure may, however, be embodied in many different forms and should not be construed as limited to the exemplary embodiments set forth herein. It is also understood that the term "cable" is not limiting, and refers to wires, cables, electrical lines, or any other materials that are dispensed from a reel, stem, barrel, or any other container.

The present disclosure provides for a system and method for automatically detecting and discarding tie-in sections of manufactured electrical cables, including armored cables and metal-clad cables, during the coiling and packaging process.

Referring to FIG. 1, a diagram of an exemplary cable is shown. The cable 100 consists of one or more internal conductors 102 and 104. Internal conductors 102 and 104 include, but are not limited to, bare conductors, insulated conductors and insulated/jacketed conductors. The internal conductors 102 and 104 are enveloped by a sheath 106. Sheath 106 may be made of a wide variety of materials including, but not limited to, conducting material such as aluminum or steel. Cable 100 may also be of different types including, but not limited to, corrugated, interlocking, waterproof/liquid-tight, flexible metal conduit, or non-armored cables. Cable 100 includes, but is not limited to, armored cable and metal-clad cable.

Referring now to FIGS. 2 and 5-7, an overview of an armored cable rewinding system in accordance with one embodiment of the invention is shown. A takeup reel 110 is shown. The takeup reel 110 in this embodiment is functioning as a payoff reel. The takeup reel 110 includes armored cable 120*a*-*x* which was wound on the takeup reel 110 during manufacture or spooling of the armored cable 120*a*-*x*. The armored cable 120*a*-*x* is in distinct sections that are not coupled together yet wound on the same takeup reel 110. The armored cable 120*a*-*x* includes metal-clad cable. A rewind takeup reel 130 pulls the armored cable 120*a*-*x* from the takeup reel 110 to reorient the armored cable 120*a*-*x* for packaging. The armored cable 120*a*-*x* passes through an inspection station 125. An operator at the inspection station 125 examines the armored cable 120*a*-*x* as it is pulled by the rewind takeup reel 130. When the end of a section of the armored cable 120*a*-*x* is detected, the operator stops the pulling of the armored cable 120*a*-*x* and securely connects 302 or couples the end of the current section of the armored cable 120*a* with the end of the next section of the armored cable 120*b*. This process of securely connecting and coupling is known as a tie-in 302. Once the sections are connected 302, the operator applies a visual cue 304 to the tie-in 302. In one embodiment, a colored label, such as a teal label, is applied to the tie-in 302 to act as a visual cue 304. A change in shape, size, or color may act as a visual cue 304. Once the visual cue 304 is applied to the armored cable 120*a-x*, the operator restarts pulling the armored cable from takeup reel 110. The process is repeated until the desired amount of armored cable 120 is wound on the rewind takeup reel 130.

Referring now to FIGS. 3 and 5-7, the cable packaging system in accordance with one embodiment of the invention is shown. A cable packaging system 10 includes a cable payoff reel 12 of a cable 11. In an embodiment with armored cable, the cable payoff reel 12 is the same reel as the rewind takeup reel 130 and the cable 11 is the same as the armored cable 120 as described herein. In the embodiment with non-armored cable, the cable payoff reel 12 is any takeup reel including electrical cable with tie-ins 302 and the electrical cable is the same as cable 11. In the armored cable embodiment, the visual cue 304 is applied during the rewinding of the armored cable 120*a-x*. In a non-armored cable embodiment, the rewinding process is typically not performed, however, the rewinding process may be implemented in non-armored cables. In the non-armored embodiment, the cable 11*a-x* is pulled from the cable payoff reel 12 which is the same as the takeup reel (not shown). The cable 11*a-x*, in this embodiment, is in distinct sections that are not coupled together yet wound on the cable payoff reel 12. In this embodiment an operator will securely connect 302 or couple the end of the current section of the cable 11*a* with the end of the next section of the cable 11*b*. As discussed herein, this process is known as a tie-in 302. Once the sections are connected 202, the operator applies a visual cue 304 to the tie-in 302. As described herein, a colored label, such as a teal label, is applied to the tie-in to act as a visual cue 304 to designate the tie-in 302 location. In one embodiment, the ends of the sections of cable 11*a-x* are accessible by the operator through the flange of the cable payoff reel 12 facilitating the operator to perform tie-ins 302. In this embodiment, the tie-ins 302 are applied while the cable 11*a-x* is being pulled from the cable payoff reel 12. Once the visual cue 304 is applied to the cable 11, the cable 11 and armored cable 120 are acted upon in the same way by the remaining elements of the cable packaging system 10.

In one embodiment, the cable 11 is pulled from the cable payoff reel 12 by the coiling heads of the coiling and/or packaging equipment 18. Many varieties of packaging equipment are known, including, but not limited to, a Windak® machine which prepares coils of up to two hundred (200)/two hundred fifty (250) feet of cable 11. Additionally, the cable 11 may pass through an accumulator (not shown) and a dancer (not shown) in one embodiment. The coiling and/or packaging equipment 18 may be programed to pull a set footage of cable 11 from the cable payoff reel 12, cut the armored cable 11 with a cutting apparatus including those known to one skilled in the art, and collect the coiled armored cable 11 for packaging and delivery in the collection area 20.

According to one embodiment, the cable packaging system 10 includes a sensor 16, such as a Keyence color sensor. In another embodiment, the cable packaging system 10 may utilize a photoelectric sensor. The sensor 16 detects the tie-in 302 visual cue 304 by detecting a color, a change in shape, or a change in size. The sensor 16 is located between the cable payoff reel 12 and a cutting apparatus 24 of the coiling and/or packaging equipment 18. The sensor 16 is focused on the cable 11 as it is pulled from the cable payoff reel 12. The sensor's 16 line of sight may be restricted to the cable 11 travel path. The sensor 16 detects the visual cue 304 of the tie-in 302 such as the actual tie-in, a label, a colored label, a change in shape, or a change in size. A color sensor may be set to detect a specific color including, but not limited to, teal. The sensor 16 detects the visual cue 304 on the cable 11 designating a tie-in 302. Once detected, the sensor 16 executes a program on the coiling and/or packaging machine 18. In another embodiment, the sensor 16 signals the coiling and/or packaging machine 18 to execute the program. The program, once executed, allows the cable 11 to continue to be pulled for a predetermined footage length or a predetermined length of time before stopping the pulling of the cable 11. This delay in stopping the pulling of the cable 11 allows the tie-in 302 section of the cable 11 to move beyond the cutting apparatus 24 of the coiling and/or packaging machine 18. The predetermined footage length or a predetermined length of time before stopping the pulling of the cable 11 may be modified by the operator or another individual to account for variations to the speed or distance due to a multitude of factors including, but not limited to, the size or type of cable 11.

After pulling of the cable 11 has stopped and the tie-in 302 section has moved beyond the cutting apparatus 24, the cable 11 is cut and the coiled cable 11, which includes the tie-in 302, is discarded outside of the normal product travel path to a discard area 22. The discard area 22 may be connected to the coiling and/or packaging machine 18 by a conveyor 52 or other transportation device. Additionally, stretch wrap, twine, or other known materials may be placed around the discarded armored cable coil to restrict uncoiling.

In one embodiment, the cutting apparatus 24 is controlled by the coiling and/or packaging machine 18, such as the Windak® machine, and the cable 11 is cut automatically without operator involvement. In another embodiment, the cable 11 is wound upon a customer reel, up to five hundred (500)/one thousand (1000) feet. In this embodiment, the sensor 16 signals the coiling and/or packaging machine 18 in the same manner as discussed above and the coiling and/or packaging machine 18 executes the program to allow the cable 11 to continue to be pulled for a predetermined footage length or a predetermined length of time before stopping the pulling of the cable 11. In this embodiment, however, the coiling and/or packaging machine 18 alerts the operator of a stoppage. The cutting of the cable 11 and discarding of the coiled cable on the customer reel is performed by the operator.

The cable packaging system 10 is independent of the operator's ability to keep track of the tie-in section. Additionally, by using the predetermined length of time, such as one (1) second, or the predetermined footage length, such as five (5) feet, the system minimizes footage overage after the tie-in is detected, decreasing the amount of product scrap.

Additionally, in one embodiment, the sensor 16 is a Keyence color sensor. The Keyence color sensor 16 may be set to detect specific color, such as teal. As the cable 11 is passing through the sensor beam of the Keyence color sensor 16, the Keyence color sensor 16 trips or registers a hit when the specific color is detected. In one embodiment, the Keyence color sensor 16 trips when it detects the teal colored label on the cable 11, the teal colored label designating a tie-in. The Keyence color sensor 16 then signals or executes a program on the coiling and/or packaging machine 18.

In another embodiment, the coiling and/or packaging machine 18 may be provided in its independent components, such as the accumulator, the dancer, the coiling heads, and the cutting apparatus 24.

Figure 4:
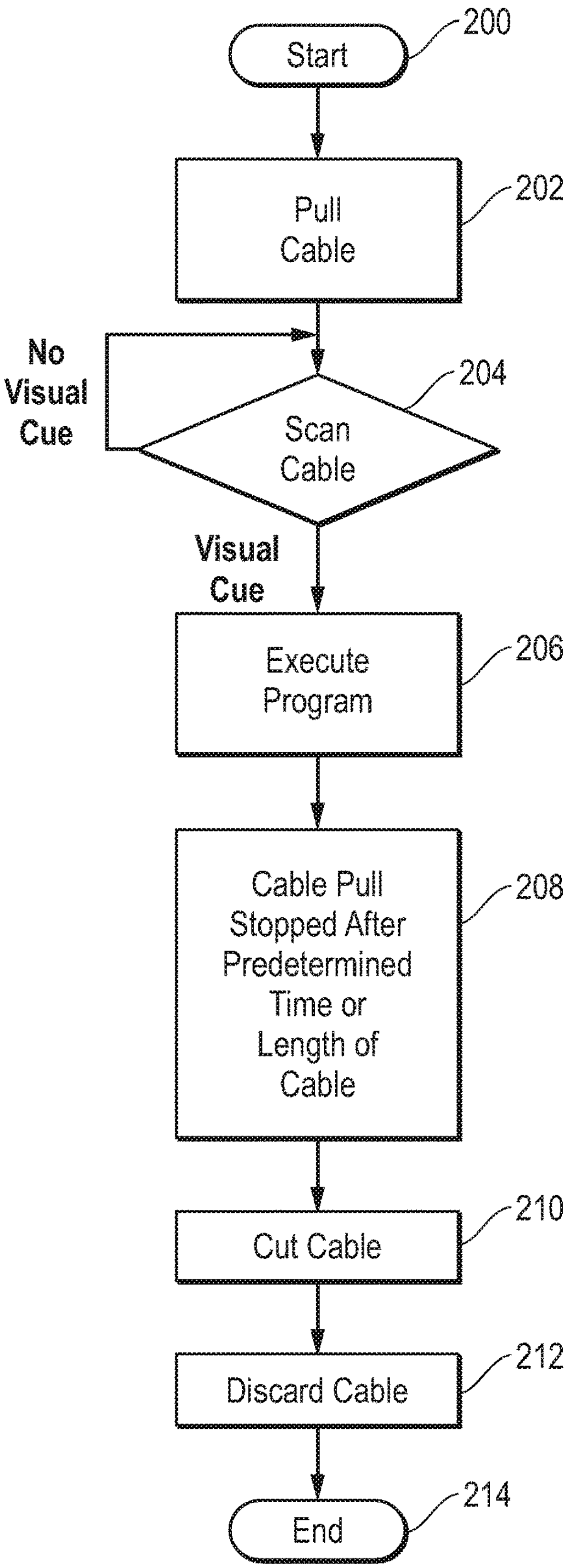
FIG. 4 depicts a flow chart of the cable tie-in detector method in accordance with one embodiment of the invention.
Figure 5:
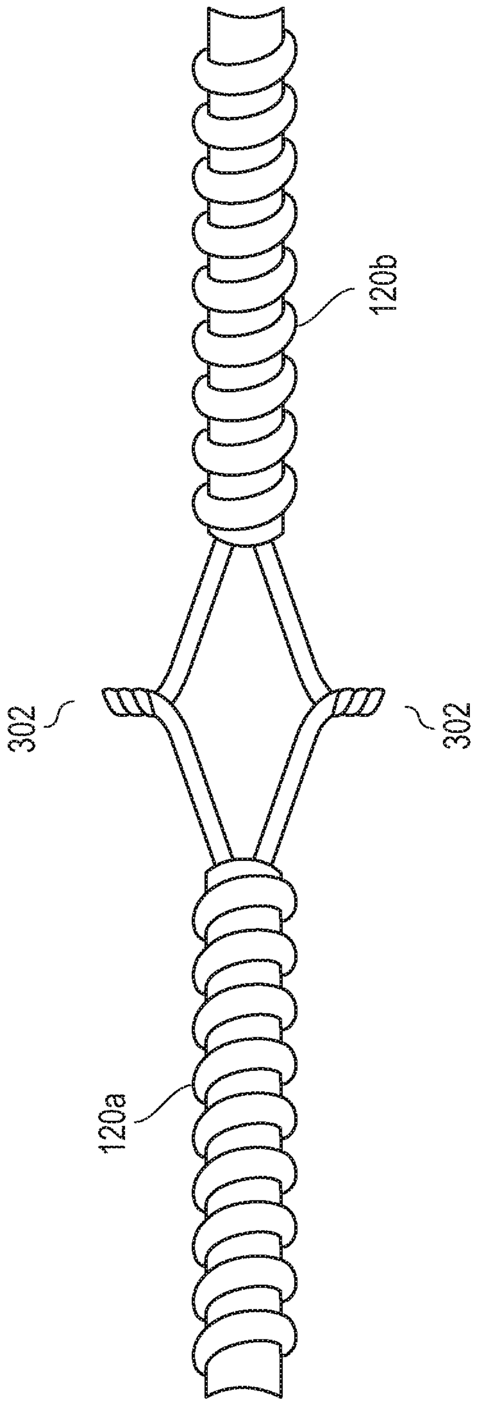
FIG. 5 is a front view of a first and second exemplary wires and cables securely connected or coupled together.
Figure 6:
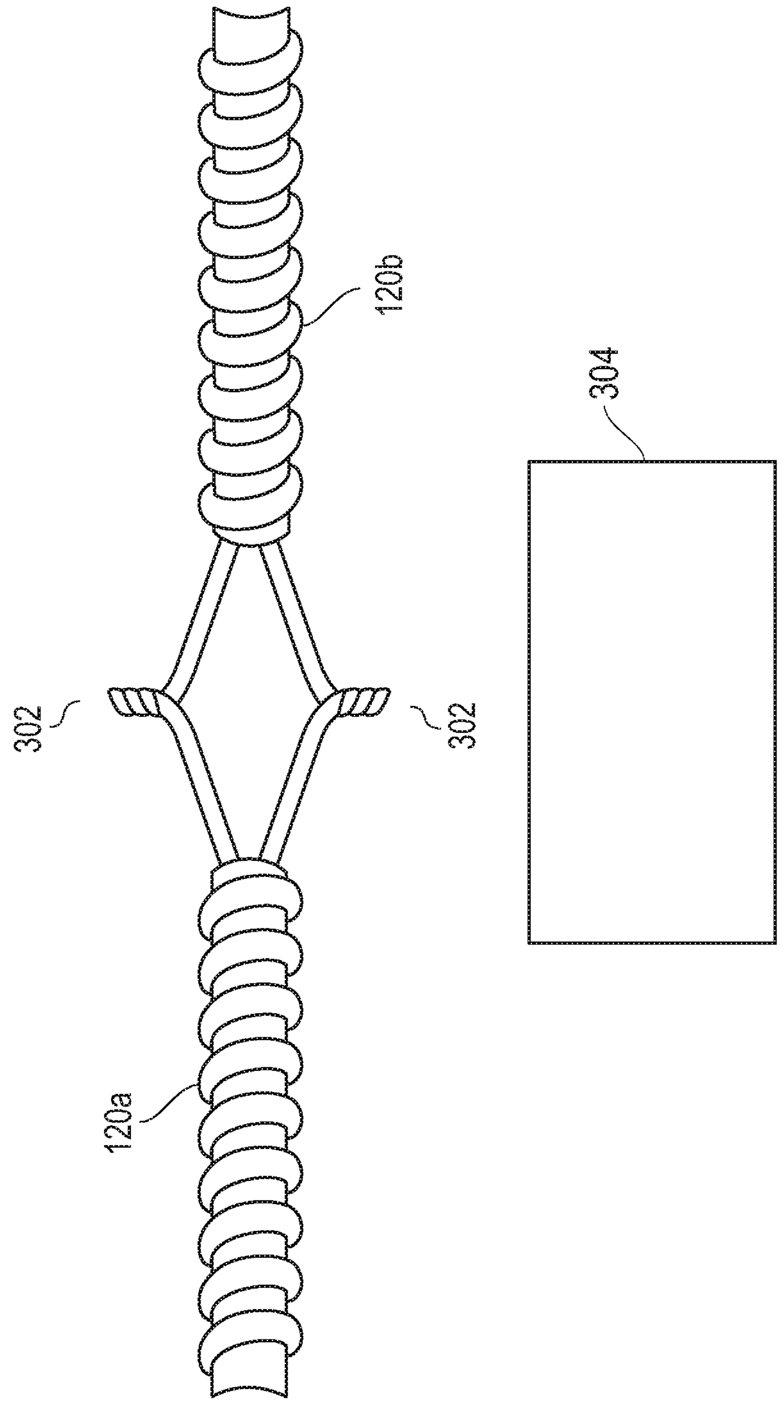
FIG. 6 is a front view of a first and second exemplary wires and cables securely connected or coupled together with an unattached visual cue.
Figure 7:
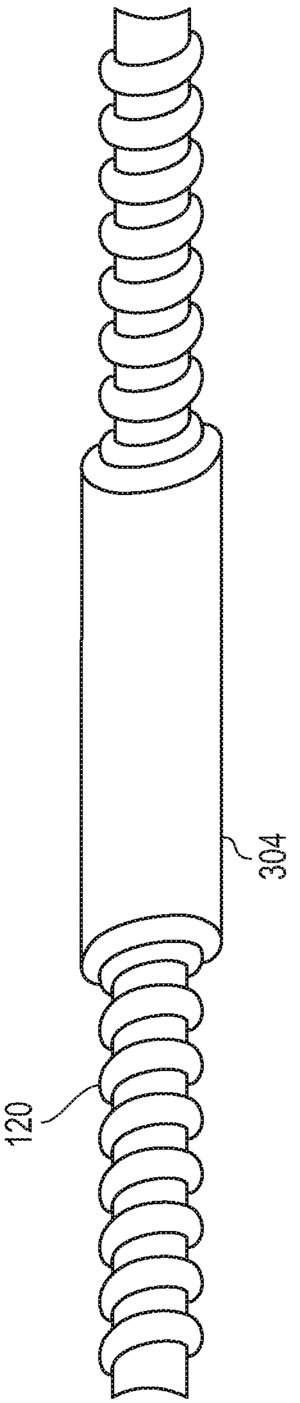
FIG. 7 is a front view of a first and second exemplary wires and cables securely connected or coupled together with an attached visual cue.

Referring now to FIG. 4, a flow chart of the cable packaging method is shown. The method begins with Start 200. Next, in step 202, the cable 11 is pulled from the cable payoff reel 12 by the coiling and/or packaging machine 18. The cable 11 of this method includes, but is not limited to, armored cable. The sensor 16 begins to scan the cable 11 as the cable is pulled in step 204. The sensor 16 continues to scan the cable 11 until a visual cue 304 representing a tie-in 302 is detected on the cable 11. The visual cue 304 includes the tie-in itself, a label, a specifically colored label, a change in shape, or a change in size. If a visual cue 304 is detected in step 204, a program is executed in the coiling and/or packaging machine 18 in step 206. Next in step 208, the cable 11 continues to be pulled for a predetermined length of cable, such as five (5) feet, or a predetermined length of time, such as one (1) second, before the pulling of the cable 11 is stopped. This predetermined length of cable or predetermined length of time allows the tie-in 302 on the cable 11 to be pulled beyond the cutting apparatus 24. The cable 11 is cut by the cutting apparatus 24 in step 210. The cable 11 may be cut automatically by the coiling and/or packaging machine 18 or manually by an operator. Next, the coiled cable with the tie-in 302 is discarded in the discard area 22 in step 212. In one embodiment, the coiled cable is discarded via a conveyor 52. In another embodiment, the coiled cable is wrapped in a material such as stretch wrap or twine in step 212. The method ends 214.

Although the invention is described herein with reference to specific embodiments, various modifications and changes can be made without departing from the scope of the invention as set forth in the claims below. Accordingly, the specification and figures are to be regarded in an illustrative rather than a restrictive sense, and all such modifications are intended to be included within the scope of the invention. Any benefits, advantages, or solutions to problems that are described herein with regard to specific embodiments are not intended to be construed as a critical, required, or essential feature or element of any or all the claims.

From time-to-time, the invention is described herein in terms of these example embodiments. Description in terms of these embodiments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The preceding discussion is presented to enable a person skilled in the art to make and use the invention. The general principles described herein may be applied to embodiments and applications other than those detailed below without departing from the spirit and scope of the invention as defined by the appended claims. The invention is not intended to be limited to the embodiments shown but is to be accorded the widest scope consistent with the principles and features disclosed herein.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

The various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term “including” should be read as meaning “including, without limitation” or the like; the term “example” is used to provide exemplary instances of the item in discussion, not an exhaustive or limiting list thereof; the terms “a” or “an” should be read as meaning “at least one”, “one or more” or the like; and adjectives such as “conventional”, “traditional”, “normal”, “standard”, “known” and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction “and” should not be read as requiring that each and every one of those items be present in the grouping, but rather should be read as “and/or” unless expressly stated otherwise. Similarly, a group of items linked with the conjunction “or” should not be read as requiring mutual exclusivity among that group, but rather should also be read as “and/or” unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as “one or more,” “at least,” “but not limited to” or other like phrases in some instances shall not be read to mean that the narrower case is intended or required in instances where such broadening phrases may be absent. The use of the term “module” does not imply that the components or functionality described or claimed as part of the module are all configured in a common package. Indeed, any or all of the various components of a module, whether control logic or other components, can be combined in a single package or separately maintained and can further be distributed across multiple locations.

Unless stated otherwise, terms such as “first” and “second” are used to arbitrarily distinguish between the elements such terms describe. Thus, these terms are not necessarily intended to indicate temporal or other prioritization of such elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the field or any related fields are intended to be within the scope of the following claims.

What is claimed is:

1. A method of detecting a visual cue on a cable and discarding the portion of the cable including the visual cue, the method comprising the steps of:

pulling the cable including conductors from a payoff reel;

scanning the cable for the visual cue, wherein the visual cue designates a tie-in and wherein the tie-in is a coupling connection of an end of a first section of the conductors with an end of a second section of the conductors;

detecting the visual cue;

upon detection of the visual cue, stopping the pull of the cable;

cutting the cable creating a cable portion with the visual cue; and discarding the cable portion with the visual cue.

2. The method of claim 1, wherein the step of scanning the cable for the visual cue comprises scanning the cable for a label applied to the tie-in.

3. The method of claim 2, wherein the step of scanning the cable for the label applied to the tie-in comprises scanning the cable for a colored label applied to the tie-in.

4. The method of claim 1, wherein the step of discarding the cable portion with the visual cue comprises discarding the cable by a conveyor.

5. The method of claim 1, wherein the step of cutting the cable comprises automatically cutting the cable.

6. The method of claim 1, wherein the step of cutting the cable comprises manually cutting the cable.

7. The method of claim 1, wherein the step of stopping the pull of the cable comprises stopping the pull of the cable after a predetermined time has run since the visual cue was detected.

8. The method of claim 1, wherein the step of stopping the pull of the cable comprises stopping the pull of the cable after a predetermined length of cable is pulled since the visual cue was detected.

9. The method of claim 8, wherein the step of stopping the pull of the cable after a predetermined length of the cable is pulled since the visual cue was detected comprises stopping the pull of the cable after five feet.

10. The method of claim 1, wherein the step of pulling the cable from the payoff reel comprises pulling an armored cable from the payoff reel.

11. The method of claim 1, wherein the step of scanning the cable for the visual cue comprises scanning the cable for an identified color.

* * * * *